Patented Oct. 16, 1945

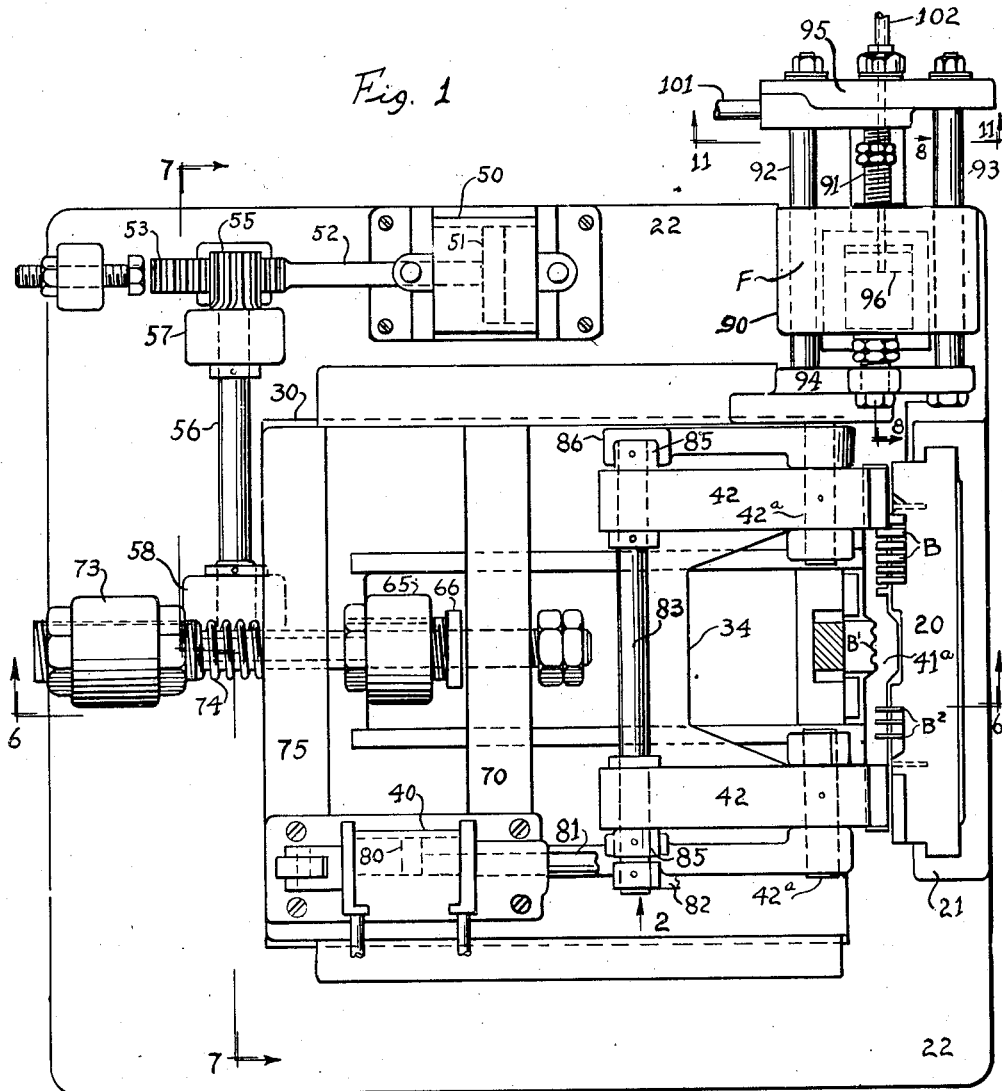
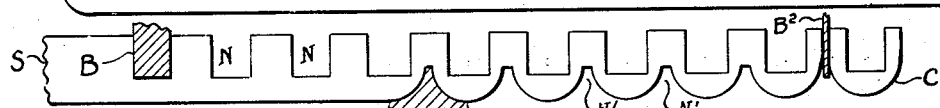
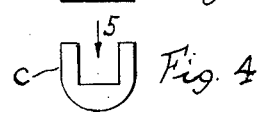
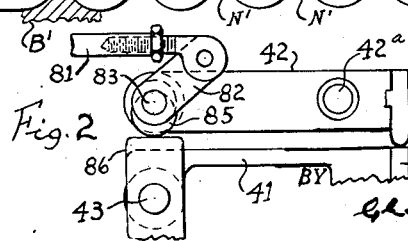
Oct. 16, 1945.   O. W. BONNAFE   2,386,838
BROACHING MACHINE
Filed Jan. 17, 1944   3 Sheets—Sheet 1
INVENTOR.
OLIVER W. BONNAFE
ATTORNEY

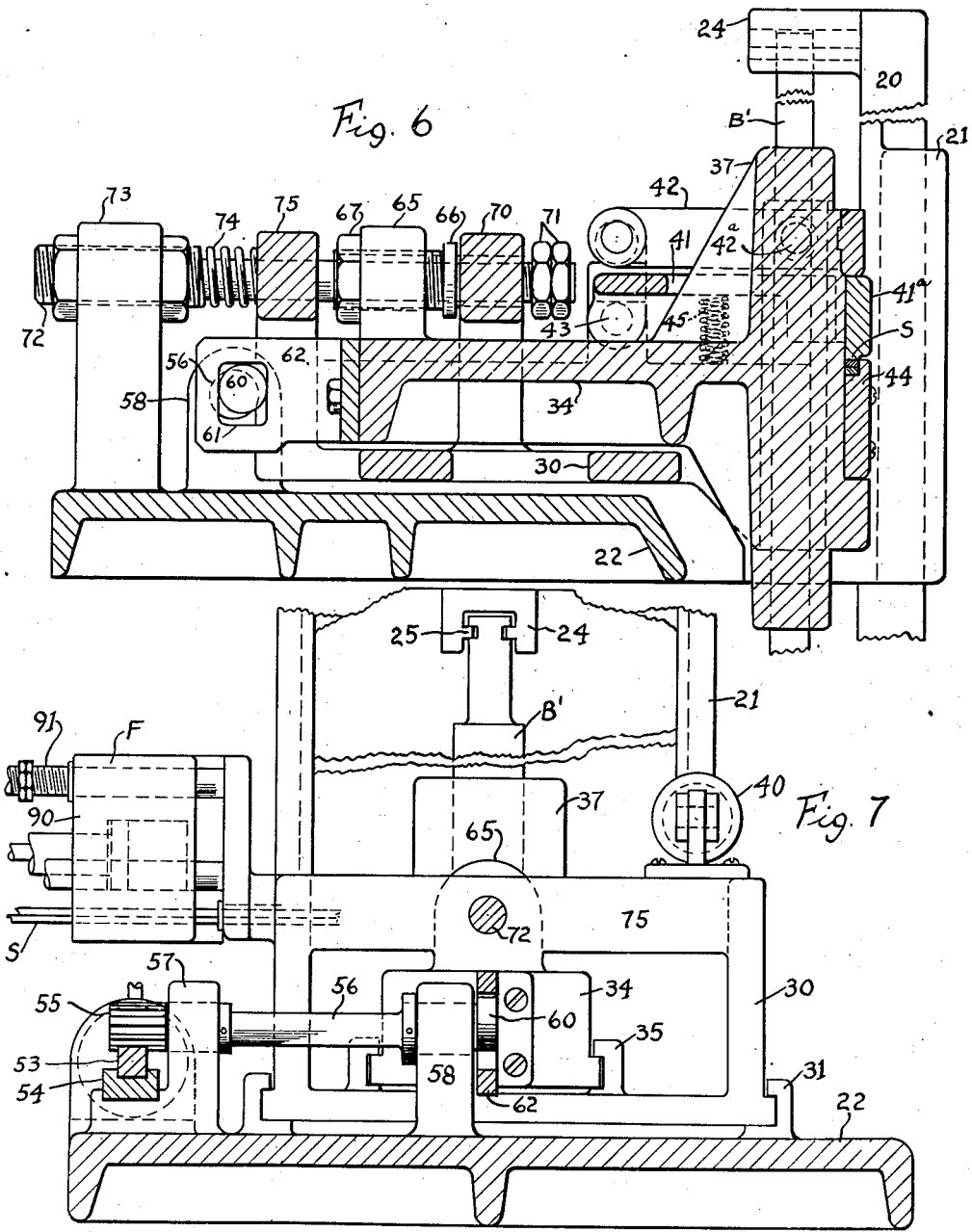

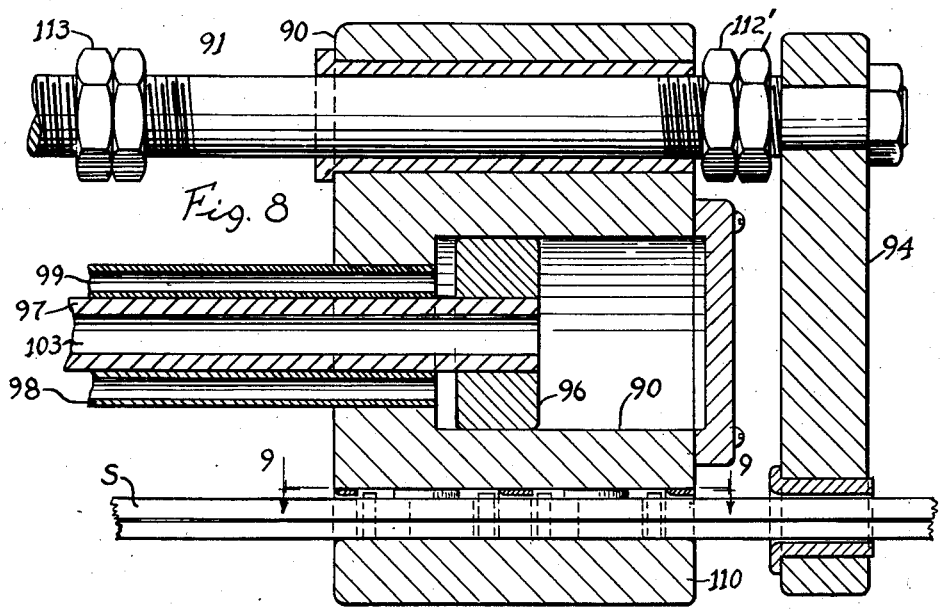
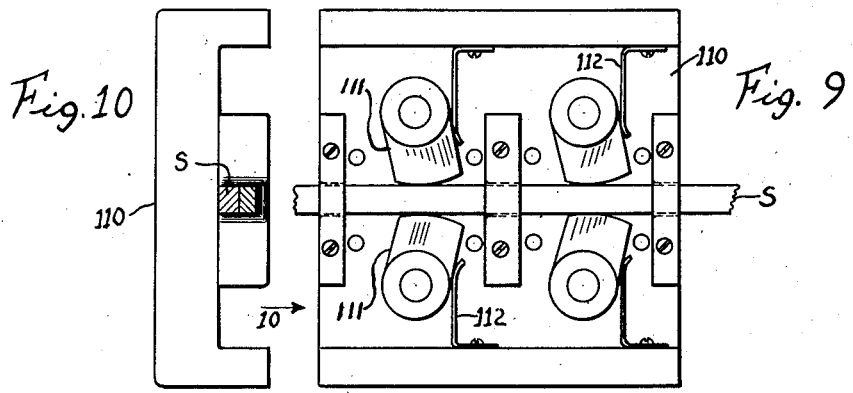
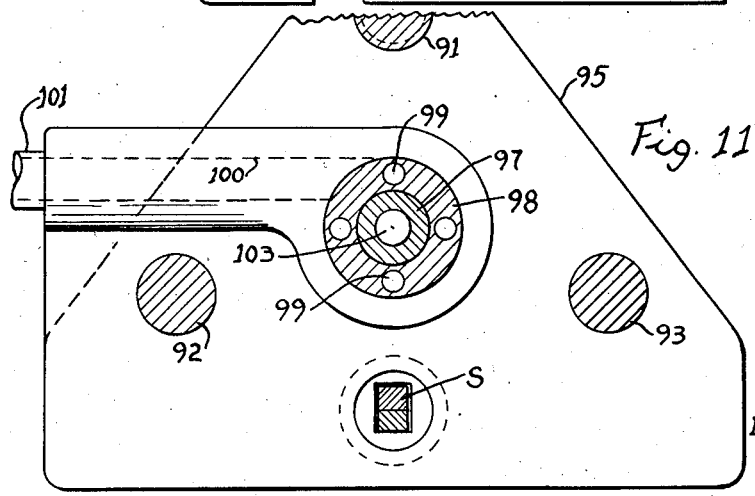

2,386,838

UNITED STATES PATENT OFFICE 2,386,838

BROACHING MACHINE

Oliver W. Bonnafe, Hudson, Mass., assignor to The Lapointe Machine Tool Company, Hudson, Mass., a corporation of Maine Application January 17, 1944, Serial No. 518,637

10 Claims. (Cl. 90—33)

This invention relates to a fixture for holding work in a machine tool. The fixture is particularly designed for use in a surface broaching machine and involves work-feeding as well as work-holding devices.

It is the general object of my invention to provide a fixture in which work may be simultaneously broached on both front and rear surfaces and in which clearance for both front and rear broaches may be provided, before return movement of said broaches is commenced. A further object is to provide improved means to feed and clamp the work in the work-holding fixture.

My invention further relates to arrangements and combinations of parts which will be hereinafter described and more particularly pointed out in the appended claims.

A preferred form of the invention is shown in the drawings, in which

Fig. 1 is a plan view of my improved work holder;

Fig. 2 is a detail side elevation, looking in the direction of the arrow 2 in Fig. 1;

Fig. 3 is a plan view of a portion of stock, with successive operations indicated thereon;

Fig. 4 is a plan view of an article to be produced;

Fig. 5 is an end view of the article, looking in the direction of the arrow 5 in Fig. 4;

Fig. 6 is a sectional side elevation of the work-holding fixture, taken along the line 6—6 in Fig. 1;

Fig. 7 is a sectional front elevation, taken along the line 7—7 in Fig. 1;

Fig. 8 is an enlarged sectional front elevation of a feeding mechanism, taken along the line 8—8 in Fig. 1;

Fig. 9 is a plan view of certain parts, taken along the line 9—9 in Fig. 8;

Fig. 10 is an end view, looking in the direction of the arrow 10 in Fig. 9; and

Fig. 11 is a partial sectional elevation, taken along the line 11—11 in Fig. 1.

While capable of general application, my improved work holding fixture is particularly designed for use in the manufacture of the U-shaped collars C indicated in Figs. 4 and 5. In the production of such collars, a rectangular strip S of steel or other suitable metal is fed longitudinally through the fixture in a series of successive and substantial steps.

The stock S is first acted upon by a series of rear broach elements B (Figs. 1 and 3), which remove portions of stock to form rectangular rear notches N. The stock S is then acted upon by a series of front broach elements B1, which remove portions of stock to form substantially V-shaped notches N' along the front edge of the stock S and alternating with the notches N previously described. The stock S is then acted upon by a series of thin rear slitting broach elements B2, which cut through into the notches N' as indicated in Fig. 3, thus forming the desired collars C.

In the actual operation of the machine, all three sets of broaches B, B1 and B2 operate simultaneously but on successive portions of stock, so that after the machine is started, each broaching stroke cuts off a plurality of collars C from the leading end of the stock, provides a plurality of front notches N' in the next adjacent portion of stock, and at the same time produces a plurality of initial rear notches N in a further portion of stock. In this way, a plurality of complete collars C are produced at each broaching operation.

The rear broaches B and B2 are mounted in a ram 20 (Figs. 1 and 6), slidable vertically in fixed guideways 21 on a fixed base 22. The ram 20 has a forwardly extending projection 24 (Figs. 6 and 7) having guides 25 to receive the T-shaped upper end of the front broach B1. This connection permits the broach B1 to be moved forward or rearward relative to the ram 20, while at the same time maintaining operative connection therewith.

A main slide 30 (Fig. 7) is mounted in guideways 31 on the base 22 and is movable forward and rearward relative thereto. An auxiliary slide 34 is mounted in guideways 35 on the main slide 30 and is similarly movable forward and rearward relative thereto.

The auxiliary slide 34 has vertical guideways 37 (Figs. 6 and 7) for the front broach B1 and determines the operating position of said broach.

The main slide 30 supports a feeding mechanism F, a clamping cylinder 40, clamping bars 41 (Figs. 2 and 6) and clamping levers 42. The clamping bars 41 have a connecting portion 41a. The levers 42 are pivoted at 42a (Fig. 2) to the main slide 30, and the arms 41 are pivoted at 43 to the same slide. The main slide 30 is provided with a horizontal guide and support 44 (Fig. 6) for the stock S, and with springs 45 to lift the clamping bars 41 when released.

The means for moving the slides 30 and 34 forward and rearward comprises a cylinder 50 (Fig. 1) mounted on the base 22 and having a piston 51 slidable therein and connected through a piston rod 52 to a rack bar 53. The rack bar 53 is slidable in a fixed guide 54 (Fig. 7) and engages a pinion 55 which is mounted on a shaft 56, rotatable in bearings 57 and 58 on the base 22.

On its right-hand end, as viewed in Fig. 7, the shaft 56 is provided with an eccentric portion 60 extending into a rectangular opening 61 (Fig. 6) in a bracket 62 fixed to the front end of the auxiliary slide 34. As the shaft 56 and eccentric 60 are rotated, forward and rearward movements will be imparted to the slide 34. The parts are so arranged that when the slide 34 is in a desired operative rearward position, the eccentric 60 will be approximately on dead center and will form a positive lock for the slide, so that the slide can resist the heavy lateral pressure of the broaches during the broaching operation.

The auxiliary slide 34 also imparts motion to the main slide 30 through an upwardly extending post 65 (Fig. 6) having a bushing 66 threaded therein and adjustably secured by a lock nut 67. As the auxiliary slide 34 moves rearward to operative position, the end of the bushing 66 engages a cross bar 70 (Figs. 1 and 6) and forces the main slide 30 rearward until the cross bar 70 engages lock nuts 71 threaded on the rear end of a shaft 72 which is mounted in a fixed post 73. A heavy spring 74 on the shaft 72 engages a second cross bar 75 on the slide 30 and assists rearward movement of the main slide. The spring also yieldingly cushions the forward movement of the slide.

A clamping cylinder 40 (Figs. 1 and 7) is provided with a piston 80 connected by a piston rod 81 (Fig. 2) to an arm 82 on a cross shaft 83. The shaft 83 is rotatably mounted in bearings in the free ends of the clamping levers 42 and is provided with eccentrics 85 which rest on fixed abutments 86 on the main slide 30. When pressure is applied in the cylinder 40, resultant movement of the piston 80 will partially rotate the cross shaft 83 and eccentrics 85, which thereby coact with the supporting surfaces 86 to rock the clamping levers 42 and apply pressure through the clamping arms 41 to the stock S. The eccentrics also serve to positively lock the levers and arms in holding position.

The feeding mechanism F shown in Fig. 1 and in detail in Figs. 8 to 11 comprises a cylinder 90 mounted to slide on guide-rods 91, 92 and 93 (Fig. 11) which are fixed in end plates 94 and 95. The plate 94 is securely mounted on the main slide 30.

A piston 96 (Fig. 8) is mounted at the inner end of a piston rod 97, which in turn is fixed to the outer end plate 95 and which is surrounded by a sleeve 98 having longitudinal passages 99 communicating with a transverse passage 100 (Fig. 11). A pipe 101 connects to the outer end of the passage 100, and a pipe 102 (Fig. 1) connects to the outer end of a passage 103 extending axially through the piston rod 97.

The piston 96 being thus fixed in position, admission of oil under pressure to the left-hand face of the piston through the passages 99 causes the cylinder 90 to move to the left for an idle return stroke, and admission of oil through the axial passage 103 will correspondingly move the cylinder 90 to the right for a feeding stroke.

A plate 110 (Fig. 10) is secured to the lower face of the cylinder 90 and supports a plurality of pivoted feed dogs 111 having eccentrically disposed end surfaces. Each dog 111 is provided with a spring 112 acting to press the eccentric end of the dog against a side surface of the stock S.

As the feed plate 110 moves with the cylinder 90 to the left in Fig. 8, the dogs 111 slip idly past the stock S, which is at that time held by the clamping bars 41 as previously described. On return movement of the cylinder to the right, the dogs 111 grip the stock and feed the stock to the right, the clamping pressure thereon having been previously released. The amount of feed is determined by the setting of lock nuts 112' and 113 on the supporting rod 91. These nuts limit the movements of the cylinder 90 in both directions.

Any usual valve mechanism may be provided for alternately connecting the pipes 101 and 102 to a supply of oil under pressure or to exhaust, as may be indicated.

Having described the details of construction of my improved work-holding fixture, the method of operation will be readily apparent. Assuming that two superposed strips of stock S have been fed into the fixture, and that at least two broaching strokes have been performed, further procedure is as follows:

As soon as the downward or cutting movements of the broaches B, B1 and B2 have been completed, pressure is applied in the cylinder 50 on the main slide 30 to rotate the shaft 56 in such a direction that the auxiliary slide 34 will be moved forward, thus withdrawing the front broach B1 from engagement with the stock S. Such forward movement of the broach is permitted by its sliding connection with the ram projection 24.

After this initial forward movement of the auxiliary slide 34 and front broach B1, the bushing 66 engages the front cross bar 70 of the main slide 30 and moves the main slide, together with the stock S and its feeding mechanism F, forward so that the stock is clear of the rear broaches B and B2, or at least free of their advanced cutting edges. The ram 20 may then be actuated to give the broaches a return upward stroke while out of cutting engagement with the stock.

Oil is then admitted to the clamping cylinder 40 (Fig. 1) to turn the cross shaft 83 and release the pressure on the stock S, after which oil is admitted through the pipe 102 (Fig. 1) to give the cylinder 90 and feed dogs 111 an operative feeding movement.

Reverse pressure is then applied in the cylinder 40 to clamp the stock, after which the pressure in the cylinder 50 is reversed to return both the main slide 30 and the auxiliary slide 34 to rearward and operative positions. The stock S and slides 30 and 34 are then in correct position for the next broaching operation.

In this manner, the stock may be fed in substantial steps through the fixture and will be successively notched on the rear and front edges and thereafter sliced or severed to form the separate collars C which are the desired product of the operation.

Particular attention is called to the fact that the eccentric connections between the operating cylinders 40 and 50 and the parts operated thereby permit hydraulic operation while at the same time providing positive and non-reversible clamping and rearward positioning.

It will be understood that the particular product indicated in Figs. 3, 4 and 5 is illustrative only, and that the fixture is capable of being utilized in the handling of stock for many different machine operations.

Having thus described my invention and the advantages thereof, I do not wish to be limited to the details herein disclosed, otherwise than as set forth in the claims, but what I claim is:

1. In a surface broaching machine having vertically reciprocated front and rear broaches, in combination, a base, a main slide movable forward and rearward on said base, an auxiliary slide mounted on said main slide and effective to operatively position and guide the front broach, a guide on said base for the rear broaches, means to clamp the work on said main slide between the front and rear broaches, and means to move the auxiliary slide and front broach forward away from the work and to thereafter move the main slide and the work forward away from the rear broaches.

2. The combination in a broaching machine as set forth in claim 1, in which the slide-moving means locks both the main slide and the auxiliary slide rigidly in operative position.

3. The combination in a broaching machine as set forth in claim 1, in which the slide-moving means is hydraulically actuated, and in which mechanical connections between said hydraulic means and said slides positively lock said slides in predetermined operative rear positions.

4. The combination in a broaching machine as set forth in claim 1, in which hydraulic means is provided for the work-clamping means, and in which mechanical connections between said hydraulic means and the work positively lock the clamping means against the work.

5. The combination in a broaching machine as set forth in claim 1, in which the clamping means comprises a work-engaging member, levers engaging said member, and cams to move said levers, said levers and member being pivotally mounted on said main slide, and said cams being pivotally mounted on said levers and engaging abutments fixed on said main slide.

6. The combination in a broaching machine as set forth in claim 1, in which work-feeding means is mounted on the main slide and is movable forward and rearward therewith.

7. The combination in a broaching machine as set forth in claim 1, in which work-feeding means is mounted on the main slide and is movable forward and rearward therewith, and in which hydraulic operating means is provided for the work-feeding means.

8. The combination in a broaching machine as set forth in claim 1, in which vertically guided broach-moving means is provided, and in which the front broach is connected for movement vertically by said broach-moving means but is also freely slidable forward and rearward relative thereto.

9. The combination in a broaching machine as set forth in claim 1, in which actuating means is provided for the broaches, and in which a slidable connection between said actuating means and the front broach permits said front broach to move freely forward and rearward relative to said actuating means, while maintaining actuating relation therewith.

10. In a surface broaching machine having front and rear broaches, in combination, means to clamp the work between the broaches, means to actuate the broaches, means to thereafter move the front broach away from the work and to move the front broach and the work simultaneously away from the rear broaches before a return movement of said broaches, means to feed the work after the return movement of the broaches is completed, and means to restore the work and the front broach to operative relation with the rear broaches.

OLIVER W. BONNAFE.